United States Patent [19]

Takashima et al.

[11] Patent Number: 5,346,528
[45] Date of Patent: Sep. 13, 1994

[54] CONTINUOUS AUTOMATIC STEEL MAKING METHOD AND FACILITY

[75] Inventors: Koichi Takashima, Toyonaka; Shoji Nakamura, Ena, both of Japan

[73] Assignee: Kyoei Steel Co., Ltd., Osaka, Japan

[21] Appl. No.: 27,243

[22] Filed: Mar. 3, 1993

[30] Foreign Application Priority Data

Sep. 18, 1992 [JP] Japan .................. 4-275456
Sep. 22, 1992 [JP] Japan .................. 4-278005

[51] Int. Cl.⁵ .............................................. C22B 4/00
[52] U.S. Cl. ............................ 75/10.15; 266/215; 266/243
[58] Field of Search ............... 75/957, 10.15; 266/215, 266/243

[56] References Cited

U.S. PATENT DOCUMENTS

| | | | |
|---|---|---|---|
| 3,807,716 | 4/1974 | Wegscheider | 266/143 |
| 4,031,309 | 6/1977 | Chitil | 266/215 |
| 4,464,197 | 8/1984 | Calderon | 75/10.15 |
| 4,543,124 | 9/1985 | Vallomy | 75/46 |
| 4,564,388 | 1/1986 | Vallomy | 75/46 |

*Primary Examiner*—Peter D. Rosenberg
*Attorney, Agent, or Firm*—Wenderoth, Lind & Ponack

[57] ABSTRACT

The present invention provides a continuous automatic steel making method and a facility which make it possible to make steel continuously and automatically by systematizing all steps of the steel making process. Steel is tapped from an electric furnace while steel making materials are continuously charged into the electric furnace. The tapped molten steel is delivered to a ladle supported by a conveying car. The conveying car is moved to a position associated with a continuous casting machine. The ladle containing the molten steel is moved from the conveying car to a position above a tundish of the continuous casting machine and the conveying car is then returned to the electric furnace. The molten steel is poured from the ladle into the tundish. All of the steps are continuously controlled and coordinated by a master controller.

21 Claims, 3 Drawing Sheets

CONTINUOUS AUTOMATIC STEEL MAKING METHOD AND FACILITY

BACKGROUND OF THE INVENTION

The present invention relates to a continuous automatic steel making method and facility, which melts steel using an electric furnace, refines molten steel in a ladle refining furnace, and casts the molten steel using a continuous casting machine.

In a conventional facility, the electric furnace, ladle refining furnace and continuous casting machine are independent machines, installed in separate places. For that reason, the movement of the ladle has to be accomplished manually, using an overhead crane, making it difficult to automate the steel making process. The facility also has problems such as creating a poor working environment due to dust or noise produced when steel making materials are charged into the electric furnace, and the high construction cost of equipment such as cranes, buildings, etc.

Moreover, with the continuous casting machine, which has been embraced in recent years from the viewpoints of productivity, energy saving, etc., there are fairly large fluctuations in the quality of molten steel fed by the electric furnace to the continuous casting machine, and this also influences the subsequent processes. Another problem with this machine is the difficulty of adjusting the tapping quantity, making it in turn difficult to supply molten steel of uniform quality, both continuously and with flexibility.

SUMMARY OF THE INVENTION

The object of the present invention is to provide a continuous automatic steel making method in which all steel making processes, such as melting steel using an electric furnace, refining the molten steel with a ladle refining furnace, casting the molten steel using a continuous casting machine, etc., are performed continuously and automatically, in which the work environment is comparatively free of dust, noise, etc., in which the construction and operating costs of the equipment are low, and in which molten steel of uniform quality is continuously fed into the continuous casting machine with flexibility with regard to tapping quantity and tapping time, etc.

To achieve the above objectives, the invention provides a process including the steps of charging steel making materials such as scrap containing iron, slag making material, etc. into an electric furnace and melting them with heat, tapping steel from the electric furnace and delivering the tapped molten steel to a ladle loaded on a conveying car, moving the conveying car on which the ladle containing the molten steel is mounted to a desired position associated with a continuous casting machine, moving the ladle containing the molten steel to a position above a tundish of the continuous casting machine from the conveying car and returning it back to the conveying car and to a position associated with the electric furnace, pouring the molten steel from the ladle into the tundish, continuously casting the molten steel poured into the tundish, and controlling these steps both continuously and in a coordinated manner.

The process may also include the steps of moving the conveying car loaded with the ladle containing the molten steel from the electric furnace to a position at a ladle refining furnace, refining the molten steel in the ladle at the refining furnace and then moving the conveying car loaded with the ladle containing the refined molten steel to the position associated with the continuous casting machine. The molten steel poured into the tundish is continuously cast by controlling these steps both continuously and in a coordinated manner.

The steps of charging the steel making materials into the electric furnace and melting them using heat and of tapping steel from the electric furnace can be carried out continuously and while the steel making materials are charged into the electric furnace, respectively.

Moreover, the steps of charging the steel making materials into the electric furnace and melting them using heat and of tapping steel from the electric furnace can be carried out in a closed environment insulated from external air.

The objects of the invention are also achieved by providing a continuous automatic steel making facility including an electric furnace, a continuous casting machine, a conveying car for shuttling a ladle between the furnace and casting machine, the continuous casting machine being provided with a ladle carrying device for transporting the ladle from the conveying car to a position above the tundish, and a control device for continuously controlling and coordinating the electric furnace, the continuous casting machine and the conveying car.

In addition, the continuous automatic steel making facility may also include a ladle refining furnace, the conveying car shuttling between the electric furnace, refining furnace and casting machine. The ladle refining furnace is provided with electrodes for refining the molten steel transferred into the ladle when the ladle is loaded on the conveying car, a ladle cover and a means for moving the ladle cover and electrodes. The control device coordinates operations of the electric furnace, the ladle refining furnace, the continuous casting machine and the conveying car.

A steel making material charging device is connected to the electric furnace, and the furnace includes a tapping device so that steel can be tapped from the furnace while steel making materials such as scrap containing iron, slag making material, etc. are continuously charged into the furnace.

The electric furnace and the steel making material charging device may each be of a closed type.

The ladle carrying device of the continuous casting machine consists of a ladle lifting & conveying car which moves on a gantry frame and a ladle lifting device supported by the former.

With the present invention, it is possible to perform the steel making process continuously and automatically by systemizing all steel making steps such as melting the steel using an electric furnace, refining molten steel using a ladle refining furnace, casting the steel with a continuous casting machine, etc. Construction, equipment and operating costs are reduced by eliminating the need for a large overhead travelling crane for carrying the ladle. Moreover, thanks to the continuous control of and automatic execution of all steel making steps, it becomes possible to continuously feed molten steel of stable quality into the continuous casting machine while maintaining flexibility with regard to the tapping quantity and tapping time.

It is possible to continuously feed stable quality molten steel into the continuous casting machine with flexibility with regard to tapping quantity and tapping time because the steel making materials such as scrap containing iron, slag making material, etc. are continuously charged into the electric furnace.

Furthermore, the work environment is improved by reducing dust, noise, etc., because the charring of steel making materials such as scrap containing iron, slag making material, etc. into the electric furnace, and the melting of such steel making materials during the heating and the tapping of steel are performed in a closed environment insulated from external air. It is also possible to reduce construction and equipment operating costs because the dust collector can be smaller than that used in the prior art.

DETAILED DESCRIPTION OF THE INVENTION

Figure 1:
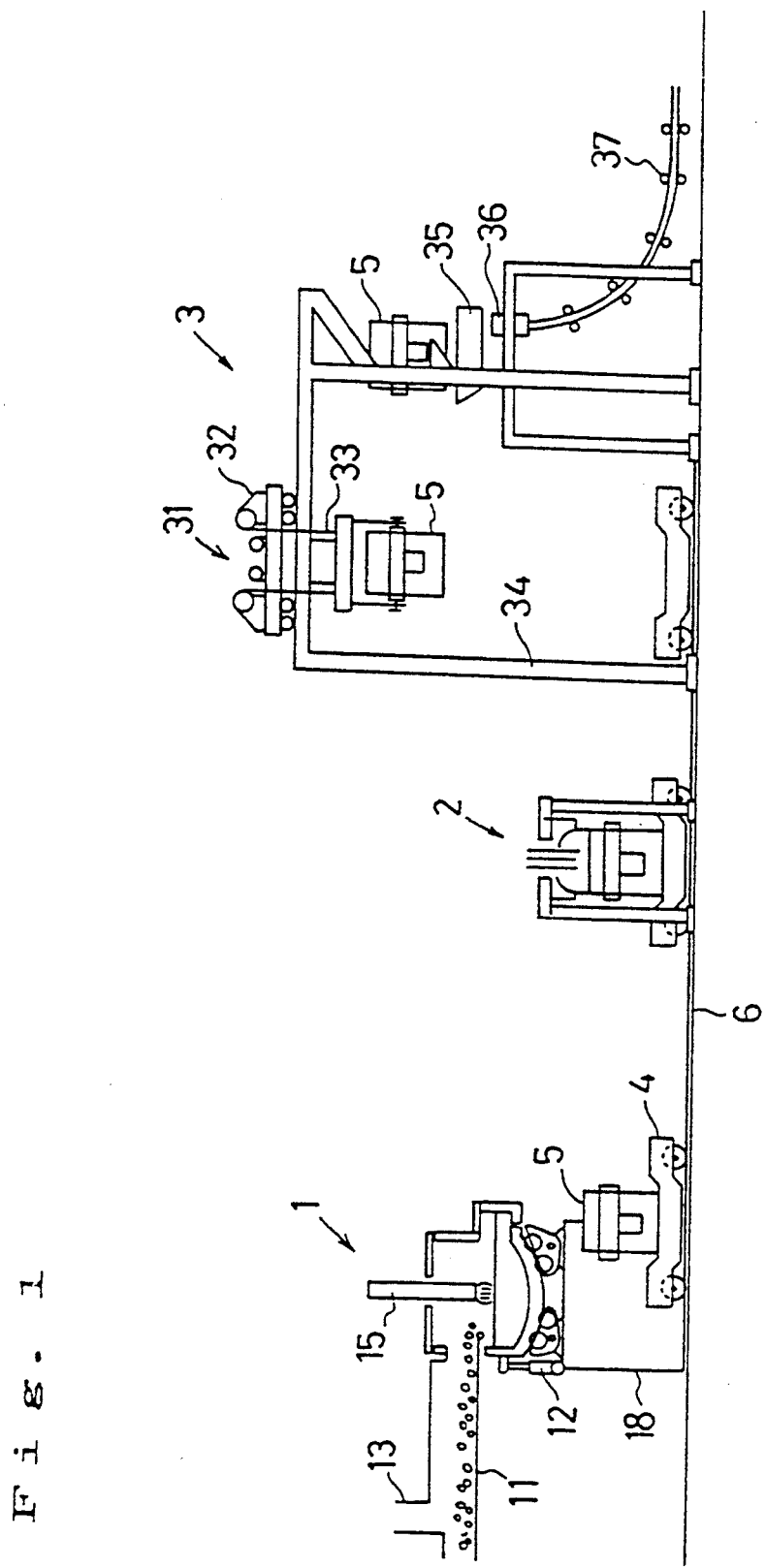
FIG. 1 is a schematic diagram of the continuous automatic steel making facility of the present invention.
Figure 2:
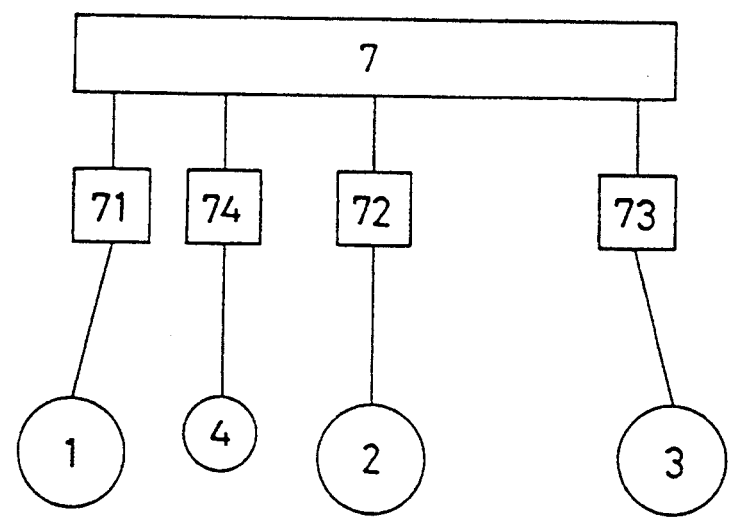
FIG. 2 is a block diagram of the controller of the continuous automatic steel making facility of the present invention.
Figure 3:
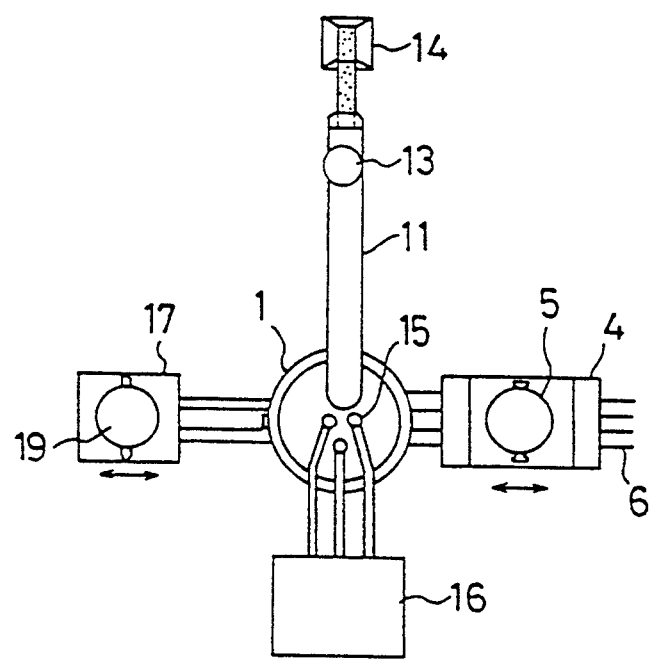
FIG. 3 is a schematic diagram of the electric furnace of the present invention.
Figure 4:
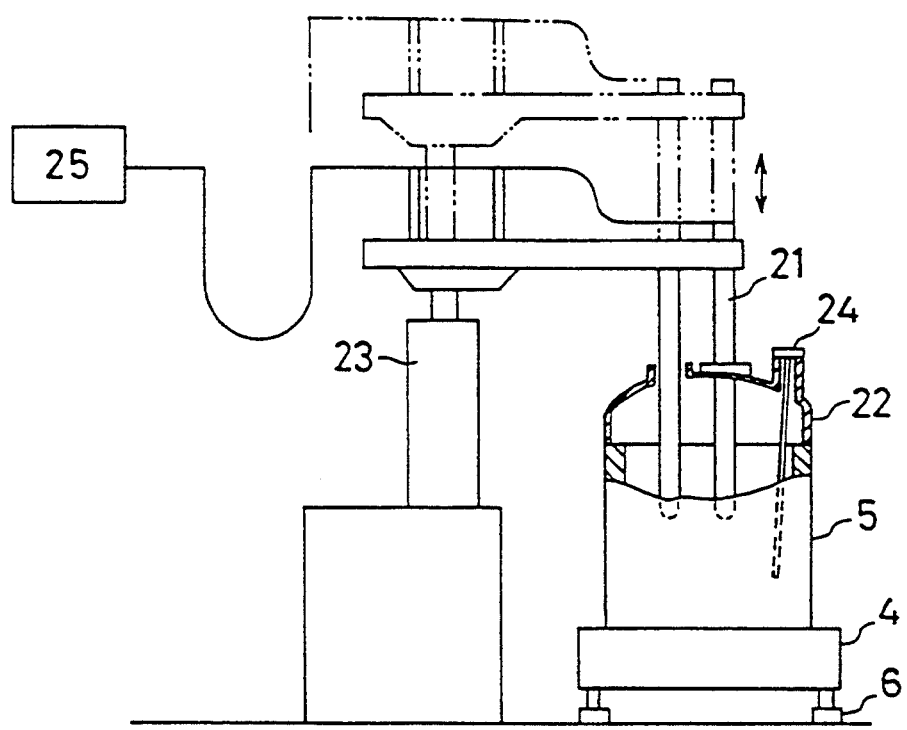
FIG. 4 is a schematic diagram of the ladle refining furnace of the present invention.

An electric furnace (1), a ladle refining furnace (2) and a continuous casting machine (3), which are the main components of the steel making facility, are arranged in line, with rails (6) disposed between those 3 machines. A conveying car (4) supporting a ladle (5) is disposed on the rails (6). The conveying car (4) is used for shuttling the ladle (5) on the rails (6). The ladle refining furnace (2) may be omitted, depending on the quality of the molten steel.

The electric furnace (1) is connected to a steel making material charging device (11) and a slide gate (not illustrated). In order to tap the electric furnace while continuously charging preheated steel making materials such as scrap containing iron, slag making material, etc., an electric furnace tilting device (12) comprising rollers and hydraulic cylinders is provided between a main body of the electric furnace (1) and the pedestal (18) of the electric furnace. The electric furnace (1) is a closed type, which facilitates the charging of steel making materials, and melts the steel making materials using heat. Tapping is carried out while the molten steel is insulated from external air. Moreover, the electric furnace (1) is provided with an electrode (15) which is connected to a power supply unit (16). Furthermore, another conveying car (17) loaded with a slag pot (19) is provided on the side opposite to the side at which tapping is carried out.

The steel making material charging device (11) is directly connected to a sealed conveyor having a cover. A heater on the lateral face of the electric furnace (1) makes it possible to heat scraps containing iron continuously charged into the furnace, together with slag. The materials in the electric furnace are insulated from the external air. The charging device (11) is also provided with an exhaust duct (13) in the neighborhood of where steel making materials such as scrap containing iron, slag making material, etc. are stored.

The electric furnace (1) is an arc furnace in this embodiment, but the invention is not limited to this, as known electric furnaces such as induction furnaces can also be used. Moreover, although the electric furnace (1) is a closed type furnace in this embodiment, the present invention is also not limited to this, as an open type furnace can be used. Furthermore, the present invention is not limited to employing a closed continuous charging machine as the material charging device (11) but can employ either a known simple continuous charging machine or a batch machine. The steel making materials such as scrap containing iron, slag making material, etc. can also be charged into the electric furnace at a normal temperature without preheating. Also, the tapping operation, which is carried out by tilting a portion of the electric furnace (1) with the electric furnace tiling device (12) in this embodiment can alternatively be carried out according to a known lip pouring method, or using a tap hole, etc.

The ladle refining furnace (2) is provided with electrodes (21) and a ladle cover (22) for refining the molten steel received from the ladle (5) loaded on the conveying car (4), a carrying device (23), a measuring instrument (24) for measuring the temperature of the molten steel and samples thereof, and a power supply unit (25).

The continuous casting machine (3) includes a ladle carrying device (31) comprising a ladle lifting & conveying car (32) which carries the ladle (5) from the conveying car (4) to a position above the tundish (35). The ladle lifting & conveying car (32) moves on a gantry frame (34) and has a lifting device (33). Moreover, the continuous casting machine (3) can also be provided with equipment such as an electromagnetic induction stirrer, a cutting device, dummy bar, etc. below the tundish (35) in addition to a continuous casting mold (36) and pinch rolls (37).

In this example, the ladle (5) is lifted upward by using the lifting device (33) of the ladle lifting & conveying car (32) and conveyed to the position above the tundish (35) because the conveying car (4) is beneath the tundish (35). However, the invention is not limited to this type of lifting & carrying device, it is also possible to move the ladle from the conveying car (4) to a position above the tundish (35) by using a rotary type swing tower as a ladle carrying device, in which case the conveying car is located at a position higher than the tundish.

A control device (71) for the electric furnace (1), a control device (72) for the ladle refining furnace (2), a control device (73) for the continuous casting machine (3), and a control device (74) for the conveying car (4) are provided, and a master controller (7) controls the respective control devices (71), (72), (73), (74).

Next, the process of continuous automatic steel making using the continuous automatic steel making facility will be described.

Scraps containing iron are charged into the electric furnace (1) together with slag making material, etc. via the continuous steel making material charging device (11) while the iron and slag making material are insulated from external air and preheated, thereby causing the charged steel materials to melt.

A bottom portion of the electric furnace (1) is tilted by using the electric furnace tilting device (12), while the charging of the steel making materials into the electric furnace (1) continues, to tap the steel and discharge slag from the slide gate.

The charging & melting of the steel making materials and the tapping step are performed while the materials are insulated from the external air. The tapped molten steel is received in the ladle (5) loaded on the conveying car (4).

The conveying car (4), on which the ladle (5) containing molten steel is loaded, is moved to the ladle refining furnace (2).

If the conveying car (4) is moved to the ladle refining furnace (2), the electrodes (21) and the ladle cover (22) are moved using the moving device (23) on top of the ladle (5) and are installed there to allow the molten steel contained in the ladle (5) to be refined. During this refining process, a powdery additive for refining is blown into the molten steel contained in the ladle (5), together with a carrier gas to control inclusions and perform desulfurization, deoxidation, etc. based on the temperature measurement and sampling of molten steel by the measuring instrument (24).

Note that the refining using the ladle refining furnace (2) may be omitted depending on the quality of the molten steel. In such a case, the conveying car (4) on which the ladle (5) containing molten steel is loaded is moved directly to the continuous casting machine (3).

In any event, the conveying car (4) is moved to a position associated with the continuous casting machine (3).

When the conveying car (4) has been moved into its position associated with the continuous casting machine (3), the ladle lifting & carrying car (32) moves on the gantry frame (34), and with the use of the lifting device (33) moves the ladle (5) from the conveying car (4) to a position above the tundish (35), and positions the ladle (5) there. Subsequently, the conveying car (4) is returned to the position in which the car (4) is associated with the electric furnace (1).

The molten steel is poured into the tundish (35) from the ladle (5), and is continuously cast into billets using the mold (36), the pinch roll (37), the electromagnetic induction stirrer, the cutting device, etc.

The operating conditions of the electric furnace (1), the ladle refining furnace (2), the continuous casting machine (3) and the conveying car (4) are controlled, respectively, by the control device (71) for the electric furnace (1), the control device (72) for the ladle refining furnace (2), the control device (73) for the continuous casting machine (3) and the control device (74) for the conveying car (4). In addition, the respective control devices (71), (72), (73), (74) are controlled by the master controller (7).

What is claimed is:

1. An automatic method of making steel, said method comprising the steps of:
   charging steel making materials into an electric furnace and melting the steel making materials using heat,
   tapping molten steel from the electric furnace,
   delivering the tapped molten steel into a ladle loaded on a conveyor car located at a position associated with the electric furnace,
   moving the conveying car, on which the ladle containing the molten steel is mounted, into a second position associated with a continuous casting machine,
   moving the ladle containing the molten steel from the conveying car at said second position to a position above a tundish, and subsequently returning the conveying car to the position associated with the electric furnace,
   pouring molten steel from the ladle into the tundish,
   continuously casting the molten steel poured into the tundish, and
   continuously controlling control devices of the electric furnace, the conveying car, and the continuous casting machine with a master controller such that said steps are coordinated with one another.

2. An automatic method of making steel, said method comprising the steps of:
   charging steel making materials into an electric furnace and melting the steel making materials using heat,
   tapping molten steel from the electric furnace,
   delivering the tapped molten steel into a ladle loaded onto a conveying car located at a position associated with the electric furnace,
   moving the conveying car, on which the ladle containing the molten steel is mounted to a position associated with a ladle refining furnace,
   subsequently refining the molten steel in the ladle on the conveying car,
   moving the conveying car loaded with the ladle containing the refined molten steel to a second position associated with a continuous casting machine,
   moving the ladle containing the refined molten steel from the conveying car at said second position to a position above the tundish, and subsequently returning the conveying car to said position associated with the electric furnace,
   pouring the refined molten steel from the ladle into the tundish,
   continuously casting the molten steel poured into the tundish, and
   continuously controlling control devices of the electric furnace, the conveying car, and the continuous casting machine with a master controller such that said steps are coordinated with one another.

3. An automatic method of making steel as defined in claim 1, wherein the step of charging steel making materials into an electric furnace and melting the materials using heat and tapping the steel from the electric furnace consist of continuously charging steel making materials into the electric furnace and tapping steel from the electric furnace while charging the steel making materials into the electric furnace.

4. An automatic method of making steel as defined in claim 3, wherein the charging of steel making materials into the electric furnace and melting the materials using heat and the tapping of molten steel from the electric furnace are performed in a closed environment insulated from external air.

5. An automatic steel making facility comprising: an electric furnace, a continuous casting machine, a conveying car carrying a ladle and which conveying car shuttles between said electric furnace and said continuous casting machine, said continuous casting machine having a tundish and a ladle carrying device which transports the ladle from the conveying car to a position above the tundish, and a master controller operatively connected to each of said electric furnace, said continuous casting machine and said conveying car, said master controller continuously controlling and coordinating operations of said electric furnace, said continuous casting machine and said conveying car.

6. An automatic steel making facility comprising: an electric furnace, a ladle refining furnace, a continuous casting machine, a conveying car carrying a ladle and which conveying car shuttles the ladle between said electric furnace, said ladle refining furnace and said continuous casting machine, said ladle refining furnace including electrodes for refining molten steel disposed in the ladle carried by the conveying car, a ladle cover and a device which moves said electrodes and said ladle cover into an operative position with the ladle carried by the conveying car when the conveying car is in a predetermined position associated with the ladle refining furnace, and said continuous casting machine having a tundish, a ladle carrying device which transports the ladle from the conveying car to a position above the tundish, and a master controller operatively connected to each of said electric furnace, said ladle refining furnace, said continuous casting machine and said conveying car, said master controller continuously controlling and coordinating operations of said electric furnace, said continuous casting machine and said conveying car.

7. An automatic steel making facility as defined in claim 5, and further comprising a steel making material charging device connected to said electric furnace so as to continuously charge steel making materials into the electric furnace, and wherein said electric furnace includes a tapping device which allows molten metal in the electric furnace to be tapped while steel making materials are continuously charged in the furnace by said steel making material charging device.

8. An automatic steel making facility as defined in claim 7, wherein said electric furnace and steel making material charging device are each closed to their exterior environments.

9. An automatic steel making facility as defined in claim 5, wherein said continuous casting machine comprises a portal frame, and said ladle carrying device consists of a ladle lifting & conveying car which moves along said portal frame and a lifting device provided on said ladle lifting & conveying car so as to move therewith, said ladle lifting device capable of lifting the ladle from said conveying car which shuttles the ladle.

10. An automatic method of making steel as defined in claim 2, wherein the steps of charging steel making materials into an electric furnace and melting the materials using heat and tapping the steel from the electric furnace consist of continuously charging steel making materials into the electric furnace and tapping steel from the electric furnace while charging the steel making materials into the electric furnace.

11. An automatic method of making steel as defined in claim 10, wherein the charging of steel making materials into the electric furnace and melting the materials using heat and the tapping of molten steel from the electric furnace are performed in a closed environment insulated from external air.

12. An automatic steel making facility as defined in claim 6, and further comprising a steel making material charging device connected to said electric furnace so as to continuously charge steel making materials into the electric furnace, and wherein said electric furnace includes a tapping device which allows molten metal in the electric furnace to be tapped while steel making materials are continuously charged in the furnace by said steel making material charging device.

13. An automatic steel making facility as defined in claim 12, wherein said electric furnace and steel making material charging device are each closed to their exterior environments.

14. An automatic steel making facility as defined in claim 6, wherein said continuous casting machine comprises a portal frame, and said ladle carrying device consists of a ladle lifting & conveying car which moves along said portal frame and a lifting device provided on said ladle lifting & conveying car so as to move therewith, said ladle lifting device capable of lifting the ladle from said conveying car which shuttles the ladle.

15. An automatic steel making facility as defined in claim 7, wherein said continuous casting machine comprises a portal frame, and said ladle carrying device consists of a ladle lifting & conveying car which moves along said portal frame and a lifting device provided on said ladle lifting & conveying car so as to move therewith, said ladle lifting device capable of lifting the ladle from said conveying car which shuttles the ladle.

16. An automatic steel making facility as defined in claim 12, wherein said continuous casting machine comprises a portal frame, and said ladle carrying device consists of a ladle lifting & conveying car which moves along said portal frame and a lifting device provided on said ladle lifting & conveying car so as to move therewith, said ladle lifting device capable of lifting the ladle from said conveying car which shuttles the ladle.

17. An automatic steel making facility as defined in claim 13, wherein said continuous casting machine comprises a portal frame, and said ladle carrying device consists of a ladle lifting & conveying car which moves along said portal frame and a lifting device provided on said ladle lifting & conveying car so as to move therewith, said ladle lifting device capable of lifting the ladle from said conveying car which shuttles the ladle.

18. An automatic method of making steel as claimed in claim 1, wherein said step of continuously controlling is carried out in a manner which causes molten steel to be continuously fed to said continuous casting machine.

19. An automatic method making steel as claimed in claim 2, wherein said step of continuously controlling is carried out in a manner which causes molten steel to be continuously fed to said continuous casting machine.

20. An automatic steel making facility as claimed in claim 5, wherein said master controller executes a control operation which causes molten steel to be continuously fed to said continuous casting machine.

21. An automatic steel making facility as claimed in claim 6, wherein said master controller executes a control operation which causes molten steel to be continuously fed to said continuous casting machine.

* * * * *